Feb. 6, 1923.
J. W. BATE,
EXTENSION HANDLE,
FILED AUG. 4, 1921.
1,444,448.
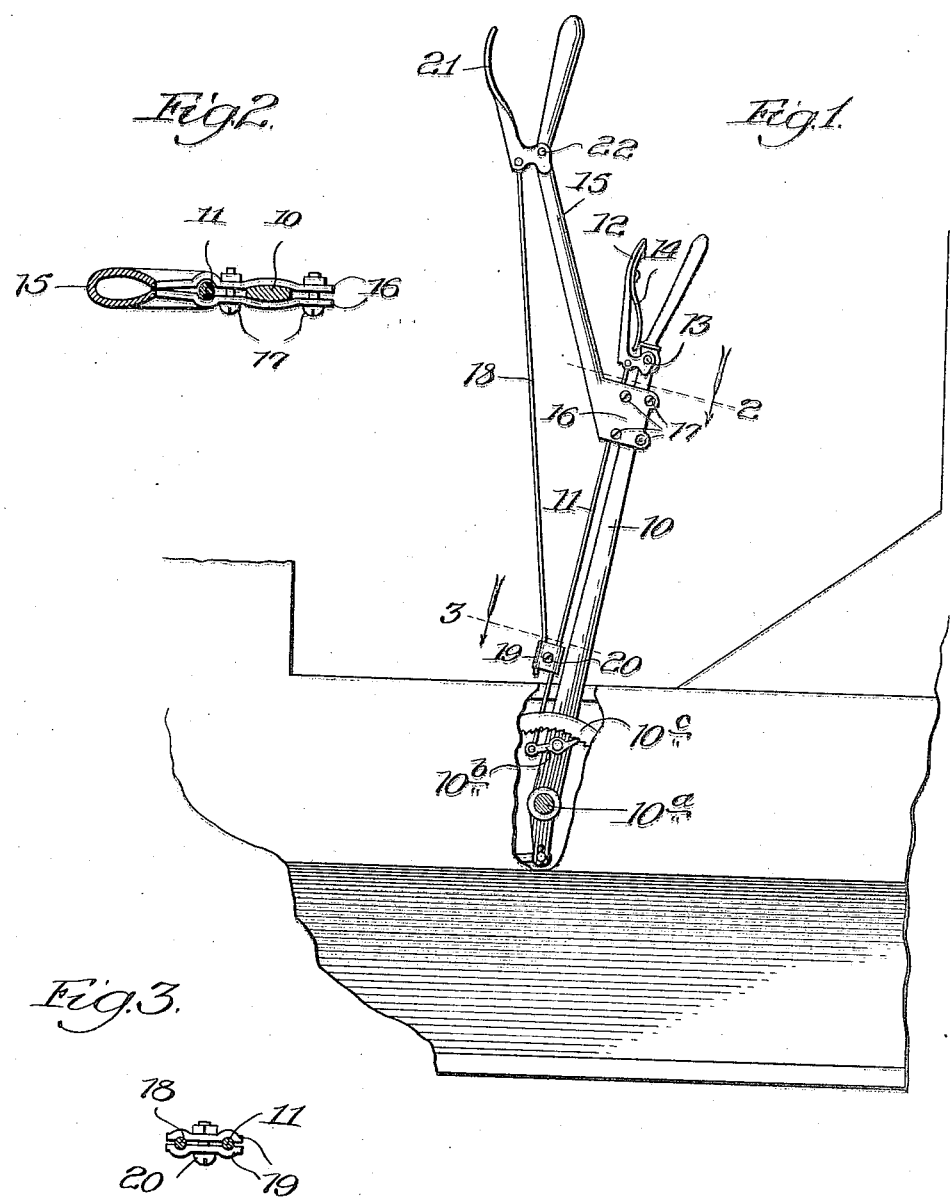

Patented Feb. 6, 1923.

1,444,448

UNITED STATES PATENT OFFICE.

JOHN W. BATE, OF RACINE, WISCONSIN.

EXTENSION HANDLE.

Application filed August 4, 1921. Serial No. 489,922.

*To all whom it may concern:*

Be it known that I, JOHN W. BATE, a citizen of the United States, residing at Racine, in the county of Racine and State of Wisconsin, have invented a new and useful Improvement in Extension Handles, of which the following is a specification.

This invention relates to extension handles and is fully described in the following specification and shown in the accompanying drawings in which—

Figure 1 is a partial side elevation of an automobile showing a control lever with my extension handle attached thereto;

Fig. 2 is an enlarged section on the line 2 of Fig. 1; and

Fig. 3 is an enlarged section on the line 3 of Fig. 1.

The control lever 10 to which this device is applied is of a well known type hingedly mounted on a pin $10^a$ and having a pawl $10^b$ mounted thereon and which is released from the quadrant $10^c$ by an upward pull on the rod 11. This rod is operated by a handle 12 to which it is pivotally attached. The handle is pivotally attached to the lever 10 at 13 and is normally held in the position shown by the spring 14.

The extension handle 15 is preferably made of sheet metal as shown in Fig. 2, the metal being bent in a generally U-shaped section and having parallel ears 16 at the bottom between which is held the lever 10 by means of bolts 17. The rod 11 is slidably mounted between these ears.

An operating rod 18 is secured at one end to the rod 11 by means of plates 19 and a bolt 20. The upper end of the rod 18 is hingedly secured to the grip 21 which in turn is hingedly mounted on the extension handle 15 by means of a pin 22.

When it is desired to shift the lever 10, the operator grasps the upper end of the handle 15 and the operating lever 21 drawing the latter toward the handle and raising the rods 18 and 11 so as to release the pawl (not shown). The handle 15 can then be moved to any desired position, carrying the lever 10 with it.

While I have illustrated but a few embodiments of my invention, it is to be understood that it is capable of many modifications. Changes, therefore, in the construction and arrangement may be made without departing from the spirit and scope of the invention as disclosed in the appended claims in which it is my intention to claim all novelty inherent to my invention as broadly as possible in view of the prior art.

What I claim as new, and desire to secure by Letters Patent, is:

1. In combination, a lever, a pawl for locking said lever, a rod carried by said lever for operating said pawl, an extension handle secured to the lever, an operating rod adjustably secured to the first mentioned rod, and a grip carried by said extension handle and connected to said operating rod for operating said pawl.

2. An extension handle made of sheet metal and having two spaced ears and bolts passing through said ears for gripping an object to which the handle is adapted to be attached.

3. In combination, a lever, a pawl for locking said lever, a rod carried by said lever for operating said pawl, an extension handle adjustably secured to the lever, an operating rod adjustably secured to the first mentioned rod, and a grip carried by said extension handle and connected to said operating rod for operating said pawl.

JOHN W. BATE.